(12) United States Patent
Pham et al.

(10) Patent No.: US 12,136,024 B2
(45) Date of Patent: Nov. 5, 2024

(54) SYSTEMS FOR CONTENT RECOGNITION AND CONTENT-BASED NETWORK LINK STORAGE AND METHODS OF USE THEREOF

(71) Applicant: Capital One Services, LLC, McLean, VA (US)

(72) Inventors: Vincent Pham, Champaign, IL (US); Anh Truong, Champaign, IL (US); Jeremy Goodsitt, Champaign, IL (US); Austin Walters, Savoy, IL (US); Alvin S. Hua, Clarksburg, MD (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 562 days.

(21) Appl. No.: 17/412,882

(22) Filed: Aug. 26, 2021

(65) Prior Publication Data
US 2023/0066505 A1   Mar. 2, 2023

(51) Int. Cl.
*H04L 29/08* (2006.01)
*G06N 20/00* (2019.01)
*H04L 67/306* (2022.01)
*H04L 67/50* (2022.01)

(52) U.S. Cl.
CPC .......... *G06N 20/00* (2019.01); *H04L 67/306* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 6,546,393 B1 * | 4/2003 | Khan | G06F 16/9562 |
| 7,899,829 B1 | 3/2011 | Malla | |
| 8,533,199 B2 | 9/2013 | Malla | |
| 2001/0042087 A1 * | 11/2001 | Kephart | G06F 16/353 |
| | | | 707/E17.09 |
| 2002/0078089 A1 | 6/2002 | Bade et al. | |
| 2003/0126560 A1 * | 7/2003 | Kurapati | G06F 16/9562 |
| | | | 715/206 |
| 2012/0216102 A1 * | 8/2012 | Malla | G06F 40/12 |
| | | | 715/206 |
| 2023/0004615 A1 * | 1/2023 | Chandrashekar | G06F 16/9035 |

\* cited by examiner

*Primary Examiner* — Natisha D Cox
(74) *Attorney, Agent, or Firm* — Greenberg Traurig, LLP

(57) ABSTRACT

Systems and methods of the present disclosure enable automated and predictive generation of shortcuts to network resources by receiving a content part of a network resource based on a user selection of a link. Monitoring user interactions with the content part are monitored to produce user interaction data, and a usage parameter is determined based on the user interaction data. When a value of the user usage parameter exceeds a threshold value, a network resource content classification associated with the link is automatically generated based at least in part on a content classification machine learning model trained to classify the content part, the network resource, or both, based at least in part on a content similarity to an existing stored network resource identifier. A stored network resource identifier is automatically generated for the link in a network resource group of a user profile associated with the network resource content classification.

17 Claims, 7 Drawing Sheets

SYSTEMS FOR CONTENT RECOGNITION AND CONTENT-BASED NETWORK LINK STORAGE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for content recognition and content-based network link storage and methods of use thereof.

BACKGROUND OF TECHNOLOGY

Network resources may typically be accessed and retrieved via resource links, which may be locally stored or cached for shortcuts to the network resources. The process for storing resource links is often cumbersome, slow and inefficient.

SUMMARY OF DESCRIBED SUBJECT MATTER

In some embodiments, the present disclosure provides an exemplary technically improved computer-based method that includes at least the following steps of receiving, by at least one processor, a user selection by a user of a link to at least one content part of a network resource; receiving, by the at least one processor, the at least one content part of the network resource returned by a network based on the link; monitoring, by the at least one processor, user interactions with the at least one content part of the network resource to produce user interaction data associated with the user; determining, by the at least one processor, at least one user usage parameter based at least in part on the user interaction data; automatically determining, by the at least one processor, when a value of the at least one user usage parameter exceeds a threshold value, at least one network resource content classification associated with the at least one content part, the network resource, or both, based at least in part on a content classification machine learning model, where the content classification machine learning model classifies the at least one content part, the network resource, or both, into the at least one network resource content classification associated with the user based at least in part on a content similarity to at least one additional content part of at least one existing stored network resource identifier; automatically generating, by the at least one processor, for the link, at least one stored network resource identifier in a network resource group of a user profile, where the at least one stored network resource identifier includes a profile link to the at least one content part or the network resource, and where the network resource group is associated with the at least one network resource content classification associated with the user.

In some embodiments, the present disclosure provides another exemplary technically improved computer-based method that includes at least the following steps of receiving, by at least one processor, a user selection by a user of a link to at least one content part of a network resource; returning, by the at least one processor, the at least one content part of the network resource based on the link; monitoring, by the at least one processor, user interactions with the at least one content part of the network resource to produce user interaction data associated with the user; determining, by the at least one processor, at least one user usage parameter based at least in part on the user interaction data; automatically determining, by the at least one processor, at least one network resource content classification associated with the at least one content part, the network resource, or both, based at least in part on a content classification machine learning model, where the content classification machine learning model classifies the at least one content part, the network resource, or both, into the at least one network resource content classification associated with the user based at least in part on a content similarity to at least one additional content part of at least one existing stored network resource identifier; automatically generating, by the at least one processor, for the link, at least one stored network resource identifier in a network resource group of a user profile, where the at least one stored network resource identifier includes a profile link to the at least one content part or the network resource, where the network resource group is associated with the at least one network resource content classification associated with the user; determining, by the at least one processor, a record rank associated with the at least one stored network resource identifier based at least in part on a comparison of the at least one user usage parameter with at least one additional user usage parameter associated with at least one additional stored network resource identifier in the network resource group; and causing, by the at least one processor, to display in the user profile on a computing device associated with the user, the network resource group including an ordered list of stored network resource identifiers based at least in part on the record rank of the at least one stored network resource identifier.

In some embodiments, the present disclosure provides another exemplary technically improved computer-based system that includes at least the following components of at least one processor configured to execute software instructions. The software instructions, when executed, cause the at least one processor to perform steps to: receive a user selection by a user of a link to at least one content part of a network resource; return the at least one content part of the network resource based on the link; monitor user interactions with the at least one content part of the network resource to produce user interaction data associated with the user; determine at least one user usage parameter based at least in part on the user interaction data; automatically determine when a value of the at least one user usage parameter exceeds a threshold value, at least one network resource content classification associated with the at least one content part, the network resource, or both, based at least in part on a content classification machine learning model, where the content classification machine learning model classifies the at least one content part, the network resource, or both, into the at least one network resource content classification associated with the user based at least in part on a content similarity to at least one additional content part of at least one existing stored network resource identifier; automatically generate for the link, at least one stored network resource identifier in a network resource group of a user profile, where the at least one stored network resource identifier includes a profile link to the at least one content part or the network resource, and where the network resource group is associated with the at least one network resource content classification associated with the user.

In some embodiments, the present disclosure provides another exemplary technically improved computer-based system and/or method further including receiving at least one record modification including at least one of: i) a record confirmation, ii) a record deletion to delete the at least one stored network resource identifier, iii) at least one content topic modification modifying the network resource group, the at least one network resource content classification or both, or iv) a combination thereof, and training the content classification machine learning model based on a difference between the at least one network resource content classification and the at least one record modification.

In some embodiments, the present disclosure provides another exemplary technically improved computer-based system and/or method further including receiving at least one record deletion deleting the at least one stored network resource identifier, training a usage threshold model based on a difference between the at least one user usage parameter and the threshold value; and generating a new threshold value based at least in part on the usage threshold model.

In some embodiments, the present disclosure provides another exemplary technically improved computer-based system and/or method further including monitoring additional user interactions with additional content of at least one additional content part of at least one additional network resource to produce additional user interaction data; determining at least one additional user usage parameter based at least in part on the additional user interaction data; receiving a user selection to create a manual record entry in the user profile for the at least one additional content part; training a usage threshold model based on a difference between the additional user usage parameter and the threshold value; and generating a new threshold value based at least in part on the usage threshold model.

In some embodiments, the present disclosure provides another exemplary technically improved computer-based system and/or method further including where the user interaction data identifies at least one of: i) at least one copied content counter identifying an amount of network resource content copied by the user, ii) at least one user visitation counter identifying how many times the user has visited the at least one content part, the network resource, or both, within a time period, iii) at least one user visitation time counter identifying an amount of time that the user has viewed the at least one content part, the network resource, or both, within the time period, or iv) a combination thereof.

In some embodiments, the present disclosure provides another exemplary technically improved computer-based system and/or method further including where the at least one content part includes at least one of: i) an electronic document, ii) a webpage, iii) a media content item, iv) an internal frame (iFrame), or v) any combination thereof.

In some embodiments, the present disclosure provides another exemplary technically improved computer-based system and/or method further including generating the network resource group for the at least one network resource content classification associated with the user.

In some embodiments, the present disclosure provides another exemplary technically improved computer-based system and/or method further including causing to display the network resource group in the user profile on a computing device associated with the user.

In some embodiments, the present disclosure provides another exemplary technically improved computer-based system and/or method further including determining a record rank associated with the at least one stored network resource identifier based at least in part on a comparison of the at least one user usage parameter with at least one additional user usage parameter associated with at least one additional stored network resource identifier in the network resource group.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of automated resource link generation and storage leveraging content recognition and network resource classification. The following embodiments provide technical solutions and technical improvements that overcome technical problems, drawbacks and/or deficiencies in the technical fields involving network resource access and retrieval, network resource recognition and the storage of links thereof. As explained in more detail, below, technical solutions and technical improvements herein include aspects of improved content recognition for network resource classification to enable improved automated network resource linking with grouping and ranking of network resource links created by the network resource linking. Based on such technical features, further technical benefits become available to users and operators of these systems and methods. Moreover, various practical applications of the disclosed technology are also described, which provide further practical benefits to users and operators that are also new and useful improvements in the art.

Figure 1:
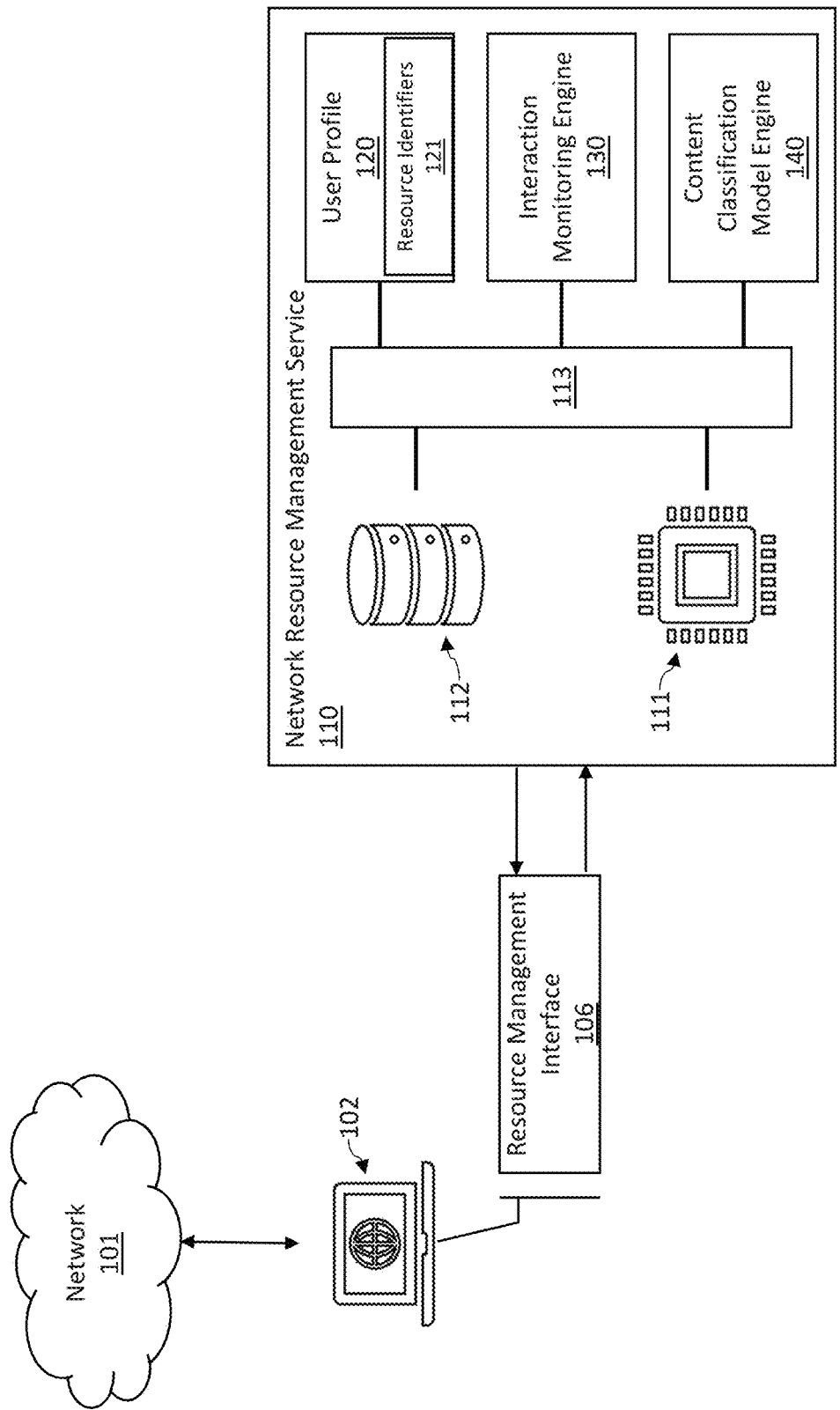
FIGS. 1-7 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of an exemplary computer-based system for network resource management in accordance with one or more embodiments of the present disclosure.

In some embodiments, a computing device 102 may interface with a network resource management service 110 that automatically manages network resource links and identifier based on content of the network resources. Network resources can include network 101 accessible documents, files, data structures, or portions thereof, among other resources and combinations thereof. For example, network resources may include, e.g., websites, webpages, Internet protocol addresses, hypertext markup language (HTML) documents, media content, electronic documents and other files, internal frames (iFrames), JavaScript™ code, among other resources. While the storage of the network resource itself may employ network 101 attached storage remote from the computing device 102 (e.g., a network database, hard drive, solid state drive, cloud service, or other network attached storage), the computing device 102 may store links to the network resources for improved accessibility. The links can include any storable or cacheable network resource link, such as, e.g., a network resource identifier or network resource link (e.g., a Uniform Resource Identifier (URI) or Uniform Resource Link (URL), among other types of links and identifiers).

In some embodiments, the network resource management service 110 may interact with the computing device 102 to detect and identify content with which a user is interacting, and automatically generate and manage the stored links to network resources based on the content and user interactions. As a result, the resource management interface 106 of the computing device 102 may more efficiently generate and organize links to network resources with improved user interfaces for user accessibility of the stored links.

In some embodiments, the user may retrieve a network resource over the network 101 by using a network resource link from the computing device 102. In some embodiments, the network resource link may include a network location associated with the network resource, as well as a mechanism for retrieving the network resource. Thus, selection or other form of utilization of the network resource link may trigger a network request via the mechanism for retrieving the network resource from the network location. In some embodiments, the mechanism may include, e.g., transfer protocol (e.g., hypertext transfer protocol (HTTP), file transfer protocol (FTP), etc.), application programming interface (API), or other mechanism and combinations thereof.

In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, as a result of the network request in response to the utilization of the network resource link, the computing device 102 may receive the network resource, including content represented therein. In some embodiments, the network resource may include, e.g., an electronic document, such as an HTML document, a protected document format (PDF) document, a Microsoft Word, Excel or PowerPoint document, an open document format (ODF) document, a JavaScript™ document, among other suitable electronic documents accessible via the network 101. In some embodiments, the content of the network resource can be provided via one or more content parts of the network resource, such as, e.g., the HTML document, the JavaScript™ document, an iFrame of the HTML document, a media content item or file (e.g., an image, an audio file, a video file, or other media content), and any other suitable sub-division of the content of the network resource and combinations thereof. In some embodiments, each content part of the network resource may be addressable via a respective network resource link, Thus, the utilization of the network resource link may return the network resource and/or a respective one or more content parts linked to the network resource link.

In some embodiments, the network 101 may include, e.g., any suitable network type, such as the Internet or an intranet. In some embodiments, the network 101 may include any suitable computer network, including, two or more computers that are connected with one another for the purpose of communicating data electronically. In some embodiments, the network 101 may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more personal computers, printers, and high-capacity disk-storage devices called file servers, which enable each computer on the network to access a common set of files. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet.

In some embodiments, upon receiving the network resource in response to the network resource link, the network resource management service 110 may interact with the computing device 102 to identify, classify, and store network resource links for the content parts and/or network resource. In some embodiments, the network resource management service 110 may be a part of the computing device 102. Thus, the network resource management service 110 may include hardware and software components including, e.g., computing device 102 hardware and software, cloud or server hardware and software, or a combination thereof. Accordingly, the network resource management service 110 may be implemented locally to the computing device 102 or provided as a service via a cloud computing service, or any suitable combination thereof.

In some embodiments, the network resource management service 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the network resource management service 110 may include storage 112, such as local hard-drive, solid-state drive, flash drive, database or other local storage, or remote storage such as a server, mainframe, database or cloud provided storage solution.

In some embodiments, the network resource management service 110 may implement computer engines for profile management, interaction monitoring and content recognition. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the network resource management service 110 may include computer engines including, e.g., a user profile 120, an interaction monitoring engine 130, a content classification model engine 140, among others. In some embodiments, the user profile 120 may maintain user-specific data and information related to user interactions and preferences. In some embodiments, the interaction monitoring engine 130 may monitor user interactions with the content parts of the network resource via the resource management interface 106. In some embodiments, the content classification model engine 140 may automatically recognize content represented in content parts associated with the network resource link and classify the content using one more machine learning models. In some embodiments, in order to implement the user profile 120, the interaction monitoring engine 130 and the content classification model engine 140, the network resource management service 110 may include dedicated or shared software components, hardware components, or a combination thereof for each of the user profile 120, the interaction monitoring engine 130 and the content classification model engine 140. For example, one or more of the user profile 120, the interaction monitoring engine 130 and the content classification model engine 140 may be utilize the storage 112 and man the processor 111 of the network resource management service 110 via, e.g., a bus 113. In some embodiments, the user profile 120, the interaction monitoring engine 130 and the content classification model engine 140 may include shared or dedicated non-transitory computer readable media including memory having software and software instructions, such as, e.g. machine learning models and/or logic for automatically managing stored network resource links according to user interactions and content classification.

In some embodiments, in response to a user selection of a link to a content part of a network resource, e.g., via a software application that interfaces with the network 101 (e.g., a web browser or other application), the network 101 and computing device 102 may return content via the software application to a user interface. For example, in some embodiments, selection of the link may cause the software application to issue a network request, e.g., via a transfer protocol, API, or other request and combinations thereof. In response, the network 101 may identify, locate and return the content part and/or network resource associated with the link.

In some embodiments, the user of the computing device 102, upon receipt of the content part or content parts, may interact with the network resource. For example, the user may select user-selectable interface elements of the network resource, copy and paste content from the network resource, view the content, navigate within the network resource, among other user interactions. In some embodiments, the interaction monitoring engine 130 may monitor the user interactions by, e.g., monitoring the software application via, e.g., a plug-in or extensions or other add on to the software application. In some embodiments, user interaction monitoring may be enabled natively by the software application. Accordingly, in some embodiments, the software application and/or add-on functionality may interface with the interaction monitoring engine 130 to log each user interaction.

For example, the software application, plug-in, extension, or combination thereof may automatically identify and record, e.g., each time a user performs a copy command for copy-and-paste interactions, the content copied by each copy command, an amount of time the user keeps the content of the network resource open, each time the user selects via a select command or select action a user-selectable interface element, a number of times the user has requested the link for the content part or content parts of the network resource, among others. Thus, to monitor user interactions, the interaction monitoring engine 130 may receive the user interactions and, e.g., maintain a copied content counter identifying an amount of network resource content copied by the user, a visitation counter identifying a number of times the user has visited the content part, content parts, the network resource, or both (e.g., within a given period of time such as one day, one week, one month, or one year or combinations and multiples thereof, or over any period of time), a user visitation time counter identifying an amount of time the user has viewed the content part, the content parts the network resource of a combination thereof (e.g., within a given period of time such as one day, one week, one month, or one year or combinations and multiples thereof, or over any period of time), among other metrics of interaction data and combinations thereof.

In some embodiments, the interaction monitoring engine 130 may utilize the interaction data to determine a user usage parameter representing a degree of usage of the network resource and/or the content part or parts associated with the link. In some embodiments, the user usage parameter may include, e.g., statistical representations of each metric of the interaction data, such as, e.g., frequencies, average frequencies, median frequencies, average quantities, median quantities, or other statistical representation of each metric of the interaction data. In some embodiments, the user usage parameter may include a statistical representation of an aggregate of the metrics of the interaction data, such as, e.g., a weighted average, weighted median, sum, or other statistical aggregation of the user interaction data into a representative value.

In some embodiments, the interaction monitoring engine 130 may utilize the user usage parameter to determine whether or not to create a locally stored network resource identifier including the network resource link to the content part and/or network resource. To do so, the interaction monitoring engine 130 may utilize the user usage parameter to determine whether user interaction with content part and/or network resource is sufficient to trigger the creation of the stored network resource identifier. For example, the user usage parameter may be, e.g., compared with a threshold value, classified as sufficient or insufficient according to a machine learning model, or by another mechanism and combinations thereof.

In some embodiments, the threshold value may be a learned value, e.g., based on prior user interactions with prior network resources and/or content parts thereof and user commands to create stored network resource identifiers with prior network resources and/or content parts thereof. For example, the threshold value may include an average or median of prior user usage parameters of each prior network resource and/or content parts thereof that have stored network resource identifiers associated therewith. In some embodiments, the average or median of the prior user usage parameters may be an average or median within predetermined period of time, e.g., within a preceding week, month, two months, three months, six months, year, or multiples and combinations thereof. In some embodiments, for more efficient but less accurate threshold values, the threshold value may be a predetermined, fixed, or user configurable value.

In some embodiments, upon a comparison the user usage parameter to the threshold value, where the user usage parameter exceeds the predetermined value, the interaction monitoring engine 130 may issue a command or instruction triggering the content classification model engine 140. In some embodiments, the content classification model engine 140 may include one or more machine learning models to automatically recognize and classify content of the content part and/or network resource of the link selected by the user. Accordingly, the content classification model engine 140 may extract content from the content part and/or the network resource.

In some embodiments, the content classification model engine 140 may be configured to utilize one or more machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, using the one or more machine learning techniques, one or more models of the content classification model engine 140 may ingest content from the content part and/or network resource and output a prediction for a content classification of the content part and/or network resource. In some embodiments, the content classification model engine 140 may employ any suitable technique for feature selection and feature extraction to ingest the content. For example, the content classification model engine 140 may employ, e.g., Bag-of-Words, filtering by word frequency, filtering stopwords, stemming of words, and other techniques for selecting and extracting features representative of the content. The selected and extracted features may then be embedded into one or more feature vectors, using a suitable embedding technique, such as, e.g., Latent Semantic Analysis, Neural Network embedded (e.g., Word2Vec, Doc2Vec, etc.) or any other suitable technique.

In some embodiments, based on the embedded features from the content and the parameters of the one or more models of the content classification model engine 140, may generate a prediction of a topic associated with the content, thus classifying the content part and/or network resource. In some embodiments, the parameters may be trained in a user-specific fashion according to existing stored network resource identifiers 121 in the user profile 120 and associated existing content parts and/or network resources by communicating with, e.g., via the bus 113, the user profile 120. Thus, the classification of the topic of the content is based on a similarity to content associated with existing stored network resource identifiers according to the learned parameters. For example, in some embodiments, the content classification model engine 140 may employ a clustering model to cluster the content part and/or network resource with additional content parts and/or additional network resources associated with existing stored network identifiers 121, e.g., in the user profile 120.

In some embodiments, the network resource management service 110 may determine whether or not to create a stored network resource identifier in the existing stored network resource identifiers 121 of the user profile 120 based on the content classification. In some embodiments, the network resource management service 110 may automatically generate the stored network resource identifier in a network resource group that is grouped according to content classification. Thus, each stored network resource identifier 121 in the user profile 120 may be grouped by topic as specified by the content classifications. For example, the network resource management service 110 may create folders or other grouping technique for the stored network resource identifiers 121. In some embodiments, the network resource management service 110 may also automatically save the content of content part and/or network resource, and link the saved content to the stored network resource identifier 121.

In some embodiments, the grouping mechanism may be dynamic and responsive to the classification of content. For example, where the content of the content part and/or network resource includes a group that does not yet exist for the existing stored network resource identifiers 121, the network resource management service 110 may create a new group for the content and store the network resource identifier in the user profile 120 according to the new group. Conversely, where a stored network resource identifier is deleted, rendering the associated group empty with no other stored network resource identifiers, the network resource management service 110 may remove the group.

In some embodiments, each stored network resource identifier 121 in the user profile 120 may include a profile link that links to a network address of the associated network resource or content part thereof according to a network resource link. Thus, each stored network resource identifier 121 may represent the profile link, as well as any other suitable network resource-related information. For example, each stored network resource identifier 121 may include, e.g., a network resource name, a network resource website or publisher, a content classification or topic, and any other suitable information.

In some embodiments, the network resource management service 110 may also check the user usage parameter for the content part and/or network resource against a network resource content classification-specific threshold value. For example, a user may instruct the creation of a stored network resource identifier more readily for some topics than for others. For example, the user may interact frequently and in large amounts with, e.g., social media or news publications, but not create any stored network resource identifiers bookmarking the social media or news publication websites. However, the user may interact relatively less frequently with, e.g., websites and electronic documents having content related to, e.g., recipes, research topics, professional development, or other types of topics and classifications.

In some embodiments, similar to the threshold value described above, each network resource content classification-specific threshold value may be learned from user behavior. For example, each network resource content classification-specific threshold value may include an average or median of prior user usage parameters of each prior network resource and/or content parts thereof that have stored network resource identifiers. In some embodiments, the average or median of the prior user usage parameters may be an average or median within predetermined period of time, e.g., within a preceding week, month, two months, three months, six months, year, or multiples and combinations thereof.

In some embodiments, the stored network resource identifier and associated network resource group may be displayed on the computing device 102 using the resource management interface 106. In some embodiments, the resource management interface 106 may include, e.g., a representation of each network resource group according to the network resource content classifications. User selection of a network resource group may reveal each stored network resource identifier 121 of the network resource group. User selection of a particular stored network resource identifier 121 may automatically request, via the network 101, the content part and/or network resource associated with the profile link of the particular stored network resource identifier 121. Thus, the network 101 may return the content and/or network resource of the particular stored network resource identifier 121 to the computing device 102 in response to the user selection of the particular stored network resource identifier 121.

In some embodiments, the resource management interface 106 may also include functionality enabling a user to add or delete stored network resource identifiers 121 from the user profile 120. For example, a user may select to "delete" or "remove" items, cause a change to the resource management interface 106 enabling a user to select particular stored network resource identifiers 121 and/or network resource groups of the user profile 120. Upon selection of particular stored network resource identifiers 121 and/or network resource groups, the particular stored network resource identifiers 121 and/or network resource groups may be deleted or otherwise removed from the user profile 120.

In some embodiments, a user selection to "add" a stored network resource identifier 121 may enable user input of a network resource link (e.g., URL, URI, network address, Internet Protocol (IP) address, or other link) and a network resource group. Alternatively, or in addition, the user selection to "add" the stored network resource identifier may automatically identify a current content part or network resource represented or received in the software application of the computing device 102 and generate the stored network resource identifier 121 for the current content part and/or network resource. In some embodiments, the user may input into the resource management interface 106 the network resource group of the current content part and/or network resource, or the resource management interface 106 may automatically request the content classification model engine 140 of the network resource management service 110 to automatically classify the current content part and/or network resource according to a topic of the associated content.

In some embodiments, the resource management interface 106 may enable user selection of modifications to stored network resource identifiers 121. For example, the resource management interface 106 may provide an interface element enabling user selection of a new network resource group of a particular stored network resource identifier 121. For example, the resource management interface 106 may include an option to select "move" or "modify" to change features of a particular stored network resource identifier 121, such as moving the particular stored network resource identifier 121 to a different network resource group, change the topic of the content classification for the particular stored network resource identifier 121, as well as any other attributes and information of the particular stored network resource identifier 121. By changing the topic or the network resource group of the particular stored network resource identifier 121, the resource management interface 106 may make the particular stored network resource identifier 121 visible upon user selection of the new network resource group and not upon selection of the previous network resource group of the particular stored network resource identifier 121.

In some embodiments, user selections and inputs into the resource management interface 106 may be used to train the threshold values as well as the models of the content classification model engine 140. In some embodiments, the threshold values, including the threshold value and the content classification-specific threshold values, may be trained according to, e.g., statistical analysis as described above, or using a usage threshold model. Accordingly, the interaction monitoring engine 130 may monitor user usage of content parts and network resources via the software application of the computing device 102, including new or additional content parts and/or network resources. The interaction data and/or resulting user usage parameter of each additional network resource and/or each additional content part may be logged in the user profile 120, e.g., for a limited period of time (e.g., about one week, one month, one year, etc.).

In some embodiments, upon, for example, manually deleting or adding a particular stored network resource identifier 121 via the resource management interface 106, the network resource management service 110 may provide the user usage interaction data and/or user usage parameter for the particular stored network resource identifier 121 to the interaction monitoring engine 130. Based on the user usage parameter for the particular stored network resource identifier 121, the interaction monitoring engine 130 may adjust the threshold value and/or content classification-specific threshold value associated with the particular stored network resource identifier 121. For example, where the user usage parameter is, e.g., an average value, the average may be recalculated with the user usage parameter of the particular stored network resource identifier 121 as a new data point for the average value.

In some embodiments, the interaction monitoring engine 130 may utilize a usage threshold model to determine the threshold value such as, e.g., a regression model, including, e.g., a recurrent neural network (RNN) with long short-term memory (LSTM) and/or gated recovery units (GRU), an autoencoder, support vector machine, linear regression model, or other regression model. The interaction monitoring engine 130 may utilize the usage threshold model to generate a threshold value based on user usage parameter histories of the stored network resource identifiers 121. Utilizing the user usage parameter of the particular stored network resource identifier 121 upon adding or deleting the particular stored network resource identifier 121, the interaction monitoring engine 130 may utilize an optimization algorithm to determine a loss for the threshold value based on a comparison between the threshold value and the user usage parameter of the particular stored network resource identifier 121. The loss may be backpropagated to the usage threshold model to update parameters of the usage threshold model to more accurately generate threshold values according to the user usage parameter and the addition or deletion of the particular stored network resource identifier 121. The usage threshold model may then be utilized by the interaction monitoring engine 130 to generate a new threshold value based on the training.

In some embodiments, the interaction monitoring engine 130 may utilize a general usage threshold model for the user profile 120. The general usage threshold model may be trained against each stored network resource identifier 121 of the user profile 120, regardless of network resource group. Thus, the general usage threshold model may generate a threshold value for determining whether an additional network resource and/or associate content part is to be added to the stored network resource identifiers 121 regardless of content classification.

In some embodiments, the interaction monitoring engine 130 may, additionally or alternatively, maintain content classification-specific threshold values. In some embodiments, the usage threshold model may generate content classification-specific threshold values using one usage threshold model that ingests content classification as an input feature along with the user usage parameter. In some embodiments, the interaction monitoring engine 130 may instead employ independent usage threshold models for each network group of the stored network resource identifiers 121 in the user profile 120. Thus, each usage threshold model may be trained separately for an associated network group.

Similarly, in some embodiments, the content classification model engine 140 may utilize the user selections via the resource management interface 106 to train the one or more models for content classification. In some embodiments, the content classification model engine 140 may receive the user selections including a network resource modification, addition, deletion or other user selection. For example, the user may select a resource confirmation confirming the stored network resource identifier 121 created for a network group based on the content classification model engine 140, a resource deletion to delete the stored network resource identifier 121, a content topic modification modifying the topic and/or changing the network resource group of the stored network resource identifier 121, among other user selections and combinations thereof. The user selection may be compared to the predicted content classification and associated topic predicted by the content classification model engine 140. Based on a loss, e.g., as determined by a comparison according to a suitable optimization algorithm, the content classification model engine 140 may train the one or more models for network resource content classification by backpropagating the loss to update the content classification parameters.

Figure 2:
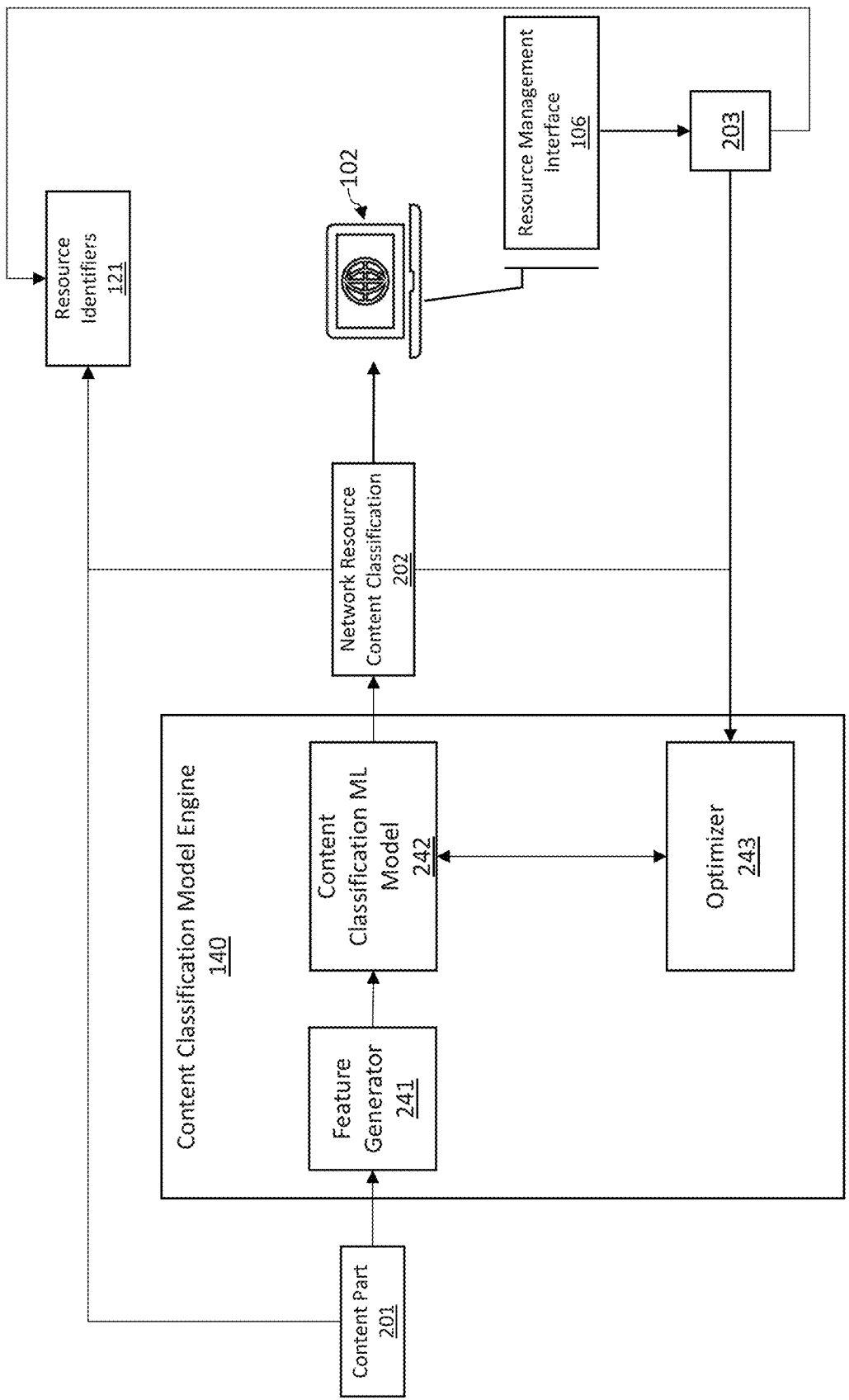

FIG. 2 is a block diagram of an illustrative content clustering model engine for network resource management in accordance with one or more embodiments of the present disclosure.

In some embodiments, the content classification model engine 140 may utilize a content classification machine learning model 242 to predict a network resource content classification 202 for at least one content part of a network resource for which a user usage parameter exceeds the threshold value. In some embodiments, upon determination that the user usage parameter exceeds the threshold value, e.g., by the interaction monitoring engine 130, the content classification model engine 140 may perform feature engineering with the feature generator 241, predict the network resource content classification 202 with at least one content classification machine learning model 242, and train the at least one content classification machine learning model 242 with an optimizer 243 based on user feedback 203.

In some embodiments, the feature generator 241 ingests the content part 201 or content parts of the network resource and selects and extracts features relevant to a topic of the content. For example, in some embodiments, the feature generator 241 may employ any suitable technique for feature selection and feature extraction. For example, the feature generator 241 may employ, e.g., Bag-of-Words, filtering by word frequency, filtering stopwords, stemming of words, and other techniques for selecting and extracting features representative of the content. The selected and extracted features may then be embedded into one or more feature vectors, using a suitable embedding technique, such as, e.g., Latent Semantic Analysis, Neural Network embedded (e.g., Word2Vec, Doc2Vec, etc.) or any other suitable technique to create the feature vector(s).

In some embodiments, the content classification machine learning model 242 ingests the feature vector(s) and produces a prediction of a network resource content classification 202 for each feature vector(s). In some embodiments, to produce this prediction, the content classification machine learning model 242 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model.

In some embodiments, for computational efficiency while preserving accuracy of predictions, the content classification machine learning model 242 may advantageously include a clustering model, such as, e.g., connectivity models (e.g.,), centroid models (e.g., K-Means clustering, K-Nearest neighbors, etc.), distribution models (e.g., expectation maximization, etc.), density models (e.g., DBSCAN, OPTICS, etc.), and combinations thereof, including hierarchical clustering. In some embodiments, the user of clustering may be employed to form a self-organizing map of the stored network resource identifiers 121, enabling unsupervised learning that dynamically adjusts to the groupings of the stored network resource identifiers 121, e.g., according to network resource groups defined by topics. However, other forms of classifier models may be employed as described above for supervised, unsupervised and/or semi-supervised learning techniques.

Accordingly, the content classification machine learning model 242 ingests a feature vector(s) and processes the features encoded therein using the content classification machine learning model 242 to produce a model output vector. In some embodiments, the model output vector may be decoded to generate a label including the network resource content classification 202. In some embodiments, the network resource content classification 202 may include an indicator representing the subject or topic of the content of the content part 201. Thus, the resulting stored network resource identifier for the content part 201 may be grouped with a network group associated with the subject or topic represented by the network resource content classification 202.

In some embodiments, the network resource content classification 202 may be provided to the computing device 102, e.g., as a prediction of the network resource content classification include a network group defined by a subject or topic of content, as described above with reference to FIG. 1. In some embodiments, the network resource content classification 202 may trigger the computing device 102 to generate and display the resource management interface 106. In some embodiments, the resource management interface 106 includes a depiction or representation of, e.g., the content part 201, the network resource content classification 202, or a combination thereof, as well as interface elements to modify, confirm or deny the network resource content classification 202, e.g., as described above. For example, the user may input a user feedback 203 with an option to confirm the network resource content classification 202 as correct or deny the network resource content classification 202 as incorrect or adjust attributes to correct the network resource content classification 202. In some embodiments, the user feedback 203 may include a user selection of a confirm option or a deny option relative to the network resource content classification 202.

In some embodiments, the user feedback 203 may also include a lack of a selection. For example, the user may choose to ignore the alert of the resource management interface 106, e.g., by selecting an "ignore" element, or by not providing any selection at all. In some embodiments, where the user ignores the resource management interface 106, the lack of selection may be interpreted as a command to not take action for the network resource content classification 202, thus signaling a confirmation of the network resource content classification 202. Accordingly, the user feedback 203 may include an indication of a confirmation of the network resource content classification 202 based on the user's lack of selection.

In some embodiments, in the case of the lack of any selection, the user feedback 203 may be determined to be an ignore interaction after a predetermined period of time has elapsed without any user selection. For example, the optimizer 243 may include a timer that starts upon generation of the network resource content classification 202 and ends upon the predetermined time period elapsing. Alternatively, or in addition, the computing device 102 and/or resource management interface 106 may include the timer that starts upon receiving the network resource content classification 202. In some embodiments, the predetermined period of time may include any suitable time period for user interaction with the resource management interface 106, such as, e.g., 15 seconds, 30 seconds, 40 seconds, 40 seconds, 45 seconds, 1 minute, 3 minutes, 5 minutes, or any other suitable time period.

In some embodiments, the content classification machine learning model 242 may be trained based on the network resource content classification 202 and the user feedback 203. Based on the difference between the network resource content classification 202 and the user feedback 203, the parameters of the classification model of the content classification machine learning model 242 may be updated to improve the accuracy of the recurring data entry classification.

In some embodiments, training is performed using the optimizer 243. In some embodiments, the network resource content classification 202 fed back to the optimizer 243. The optimizer 243 may also ingest the user feedback 203. In some embodiments, the optimizer 243 may employ a loss function, such as, e.g., Hinge Loss, Multi-class SVM Loss, Cross Entropy Loss, Negative Log Likelihood, or other suitable classification loss function. The loss function determines an error based on the user feedback 203 and the network resource content classification 202. In some embodiments, the optimizer 243 may, e.g., backpropagate the error to the content classification machine learning model 242 to update the parameters using, e.g., gradient descent, heuristic, convergence or other optimization techniques and combinations thereof.

In some embodiments, the optimizer 243 may therefore train the parameters of the content classification machine learning model 242 to approximate user grouping of content parts and/or network resources according to network resource groups for the stored network resource identifiers 121. As a result, the content classification machine learning model 242 may be continually trained and optimized based on user feedback.

In some embodiments, upon generation of the network resource content classification 202, the content part 201 and the network resource content classification 202 may be entered into the stored network resource identifiers 121 of the user profile 120. In some embodiments, the network resource content classification 202 may be entered prior to user feedback 203 and then updated based on the user feedback 203, or may be modified based on the user feedback 203 prior to being entered into the stored network resource identifiers 121. In some embodiments, entering the content part 201 and the network resource content classification 202 may cause the content part 201 to be organized with the stored network resource identifiers 121 according to a network resource group associated with the network resource content classification. Thus, the resource management interface 106 may present a stored network resource identifier 121 for the content part 201 to a user according to the network group of the network resource content classification.

Figure 3:
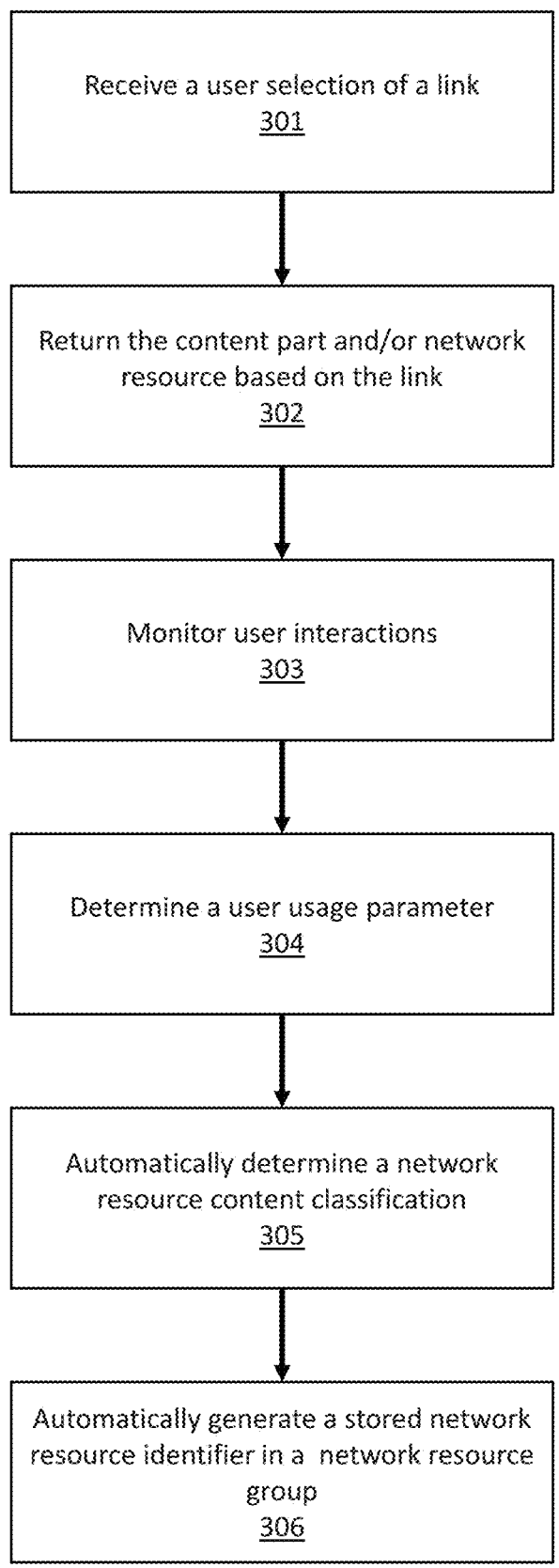

FIG. 3 is a flowchart of an illustrative method for network resource management in accordance with one or more embodiments of the present disclosure.

In some embodiments, for the automatic generation and categorization for stored network resource identifiers for automated network resource management, at least one processor may receive, at block 301, a user selection of a link to at least one content part of a network resource. In some embodiments, the user selection may be performed using a software application, as described above (e.g., a web browser or other software application for interfacing with a network to access network resources). The user selection of the link may generate a request to the network for an associated network resource. In some embodiments, in response to the request generated by the user selection of the link, the at least one processor may return, at block 302, at least one content part of the network resource based on the link.

In some embodiments, the at least one processor may monitor, at block 303, user interactions with the at least one content part of the network resource to produce user interaction data. In some embodiments, the user, upon receipt of the content part or content parts, may interact with the network resource. For example, the user may select user-selectable interface elements of the network resource, copy and paste content from the network resource, view the content, navigate within the network resource, among other user interactions. In some embodiments, the user interactions may be monitored by, e.g., monitoring the software application via, e.g., a plug-in or extensions or other add on to the software application. In some embodiments, user interaction monitoring may be enabled natively by the software application.

For example, the software application, plug-in, extension, or combination thereof may automatically identify and record, e.g., each time a user performs a copy command for copy-and-paste interactions, the content copied by each copy command, an amount of time the user keeps the content of the network resource open, each time the user selects via a select command or select action a user-selectable interface element, a number of times the user has requested the link for the content part or content parts of the network resource, among others. Thus, to monitor user interactions, the user interactions may be received and maintained as user interaction data, including, e.g., a copied content counter identifying an amount of network resource content copied by the user, a visitation counter identifying a number of times the user has visited the content part, content parts, the network resource, or both (e.g., within a given period of time such as one day, one week, one month, or one year or combinations and multiples thereof, or over any period of time), a user visitation time counter identifying an amount of time the user has viewed the content part, the content parts the network resource of a combination thereof (e.g., within a given period of time such as one day, one week, one month, or one year or combinations and multiples thereof, or over any period of time), among other metrics of interaction data and combinations thereof.

In some embodiments, the at least one processor may determine, at block 304, at least one user usage parameter based at least in part on the user interaction data. In some embodiments, the interaction data may be utilized to determine a user usage parameter representing a degree of usage of the network resource and/or the content part or parts associated with the link. In some embodiments, the user usage parameter may include, e.g., statistical representations of each metric of the interaction data, such as, e.g., frequencies, average frequencies, median frequencies, average quantities, median quantities, or other statistical representation of each metric of the interaction data. In some embodiments, the user usage parameter may include a statistical representation of an aggregate of the metrics of the interaction data, such as, e.g., a weighted average, weighted median, sum, or other statistical aggregation of the user interaction data into a representative value.

In some embodiments, the user usage parameter may be utilized to determine whether or not to create a locally stored network resource identifier including the network resource link to the content part and/or network resource. To do so, the user usage parameter may be utilized to determine whether user interaction with content part and/or network resource is sufficient to trigger the creation of the stored network resource identifier. For example, the user usage parameter may be, e.g., compared with a threshold value, classified as sufficient or insufficient according to a machine learning model, or by another mechanism and combinations thereof.

In some embodiments, the threshold value may be a learned value, e.g., based on prior user interactions with prior network resources and/or content parts thereof and user commands to create stored network resource identifiers with prior network resources and/or content parts thereof. For example, the threshold value may include an average or median of prior user usage parameters of each prior network resource and/or content parts thereof that have stored network resource identifiers associated therewith. In some embodiments, the average or median of the prior user usage parameters may be an average or median within predetermined period of time, e.g., within a preceding week, month, two months, three months, six months, year, or multiples and combinations thereof. In some embodiments, for more efficient but less accurate threshold values, the threshold value may be a predetermined, fixed, or user configurable value.

In some embodiments, the at least one processor may automatically determine, at block 305 when a value of the user usage parameter exceeds a threshold value, at least one network resource content classification associated with the at least one content part, the network resource, or both, based at least in part on a content classification machine learning model. In some Embodiments, the content classification machine learning model classifies the at least one content part, the network resource, or both, into the at least one network resource content classification associated with the user based at least in part on a content similarity to at least one additional content part of at least one existing stored network resource identifier, e.g., stored in a user profile.

In some embodiments, the content classification machine learning model may be configured to utilize one or more machine learning techniques chosen from, but not limited to, decision trees, boosting, support-vector machines, neural networks, nearest neighbor algorithms, Naive Bayes, bagging, random forests, and the like as described above.

In some embodiments, using the one or more machine learning techniques, one or more models of the content classification machine learning model may ingest content from the content part and/or network resource and output a prediction for a content classification of the content part and/or network resource. In some embodiments, the content classification machine learning model may employ any suitable technique for feature selection and feature extraction to ingest the content. For example, the content classification machine learning model may employ, e.g., Bag-of-Words, filtering by word frequency, filtering stopwords, stemming of words, and other techniques for selecting and extracting features representative of the content. The selected and extracted features may then be embedded into one or more feature vectors, using a suitable embedding technique, such as, e.g., Latent Semantic Analysis, Neural Network embedded (e.g., Word2Vec, Doc2Vec, etc.) or any other suitable technique.

In some embodiments, based on the embedded features from the content and the parameters of the one or more models of the content classification machine learning model, may generate a prediction of a topic associated with the content, thus classifying the content part and/or network resource. In some embodiments, the parameters may be trained in a user-specific fashion according to existing stored network resource identifiers in the user profile and associated existing content parts and/or network resources. Thus, the classification of the topic of the content is based on a similarity to content associated with existing stored network resource identifiers according to the learned parameters. For example, in some embodiments, the content classification machine learning model may employ a clustering model to cluster the content part and/or network resource with additional content parts and/or additional network resources associated with existing stored network identifiers.

In some embodiments, the at least one processor may automatically generate, at block 306 for the link, at least one stored network resource identifier in a network resource group of a user profile, where the at least one stored network resource identifier includes a profile link to the at least one content part or the network resource and where the network resource group is associated with the at least one network resource content classification associated with the user. Thus, each stored network resource identifier in the user profile may be grouped by topic as specified by the content classifications.

Figure 4:
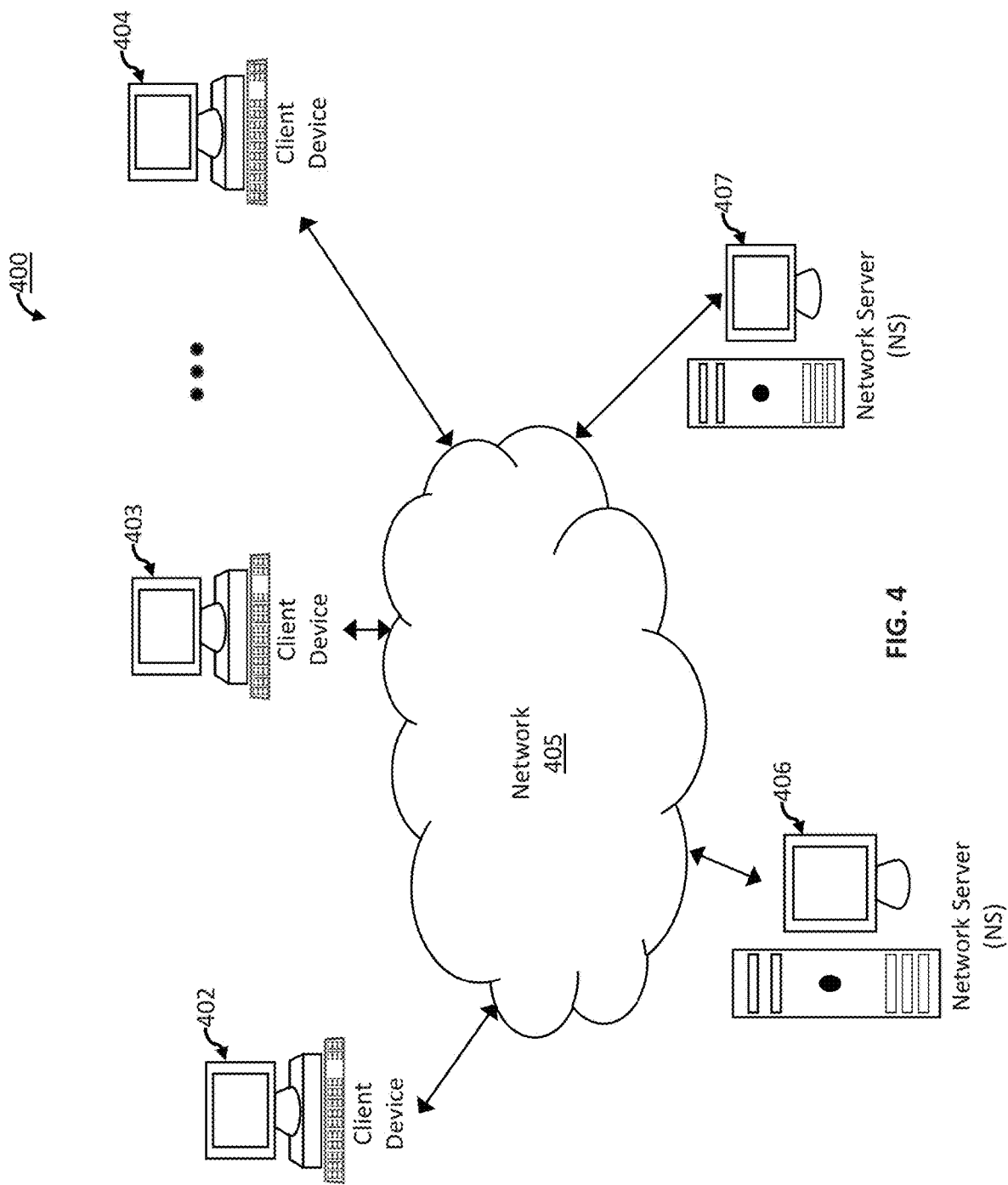

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (TRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
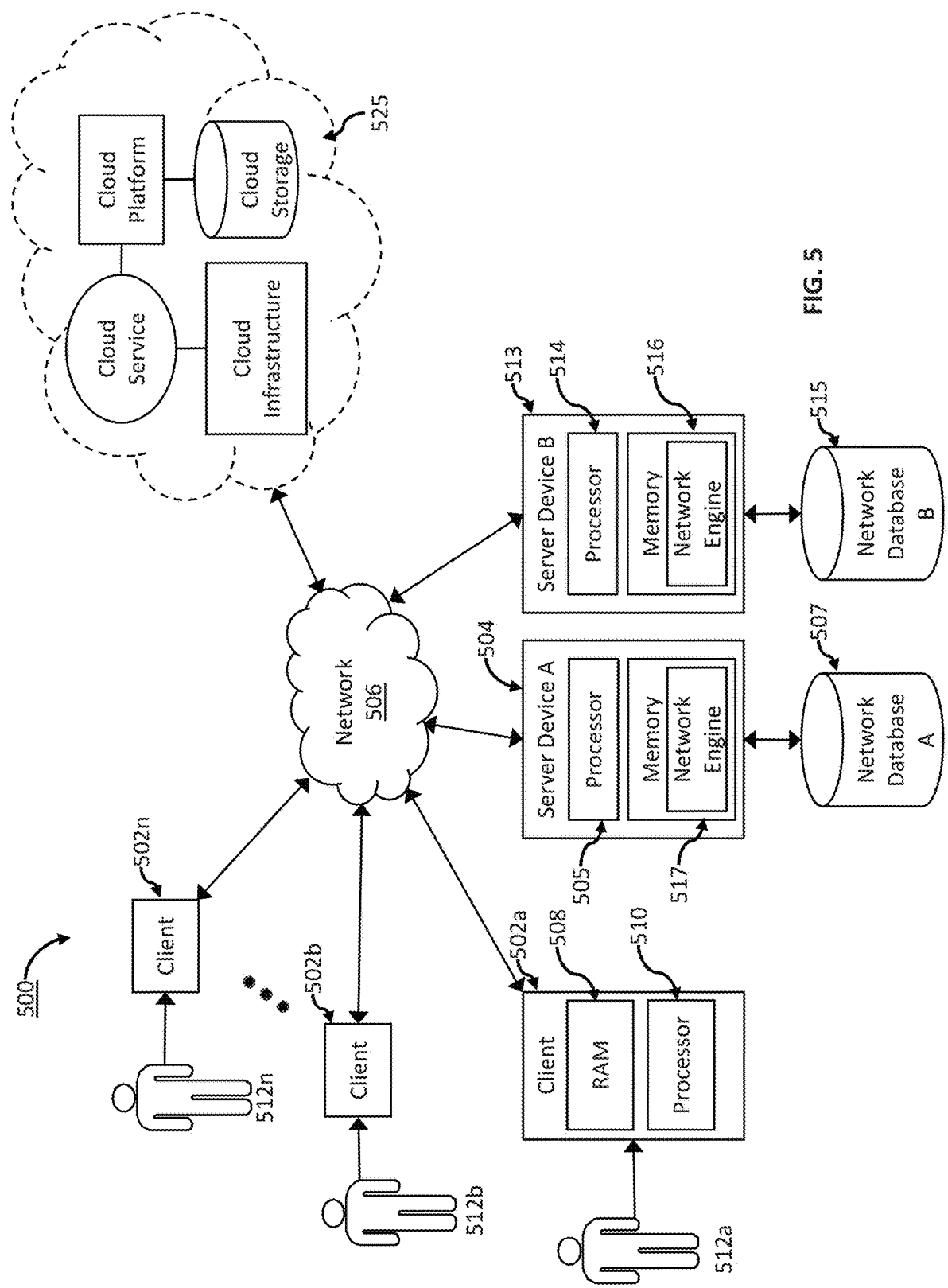

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
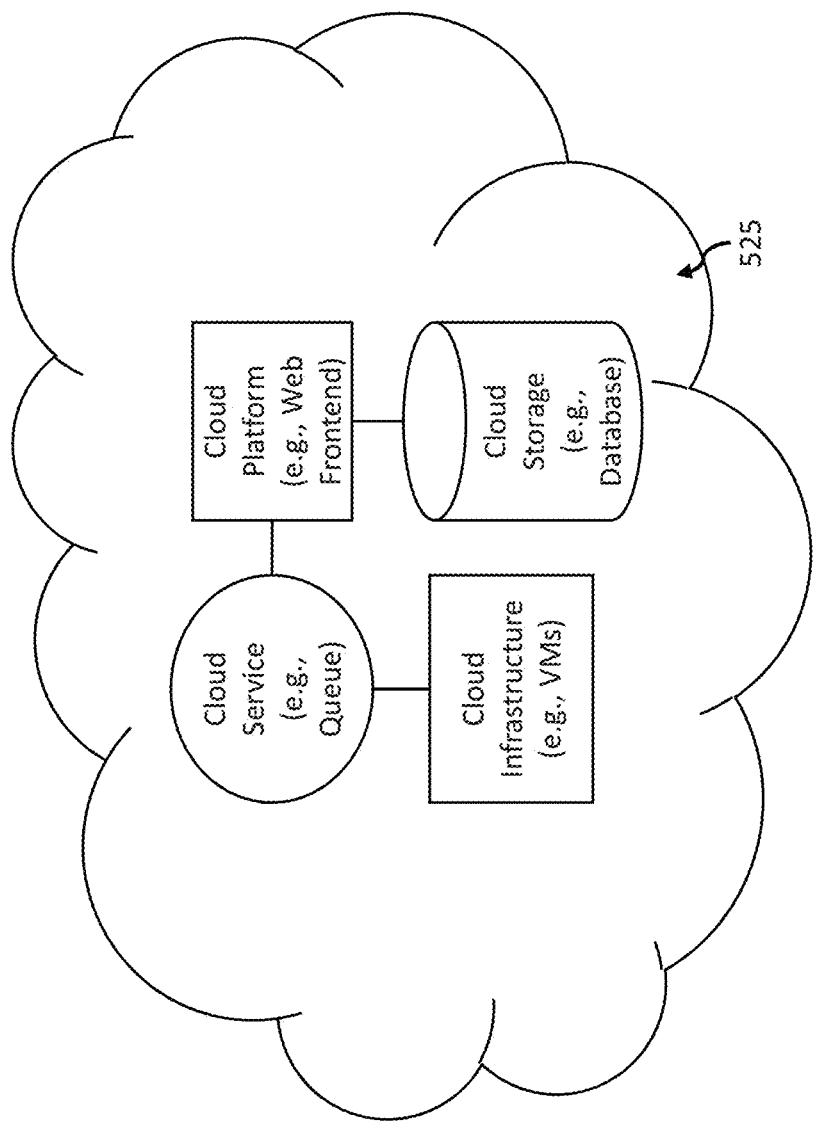
Figure 7:
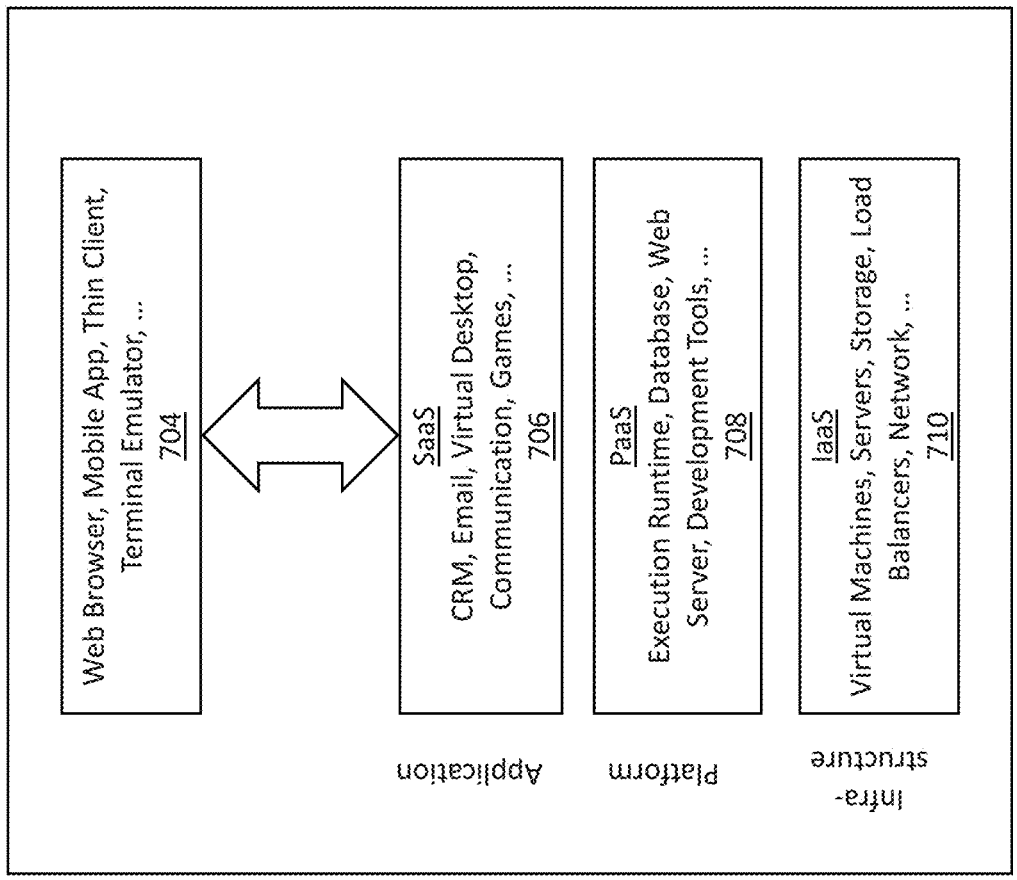

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising:
    receiving, by at least one processor, a user selection by a user of a link to at least one content part of a network resource;
    receiving, by the at least one processor, the at least one content part of the network resource returned by a network based on the link;
    monitoring, by the at least one processor, user interactions with the at least one content part of the network resource to produce user interaction data associated with the user;
    determining, by the at least one processor, at least one user usage parameter based at least in part on the user interaction data;
    automatically determining, by the at least one processor, when a value of the at least one user usage parameter exceeds a threshold value, at least one network resource content classification associated with the at least one content part, the network resource, or both, based at least in part on a content classification machine learning model;

wherein the content classification machine learning model classifies the at least one content part, the network resource, or both, into the at least one network resource content classification associated with the user based at least in part on a content similarity to at least one additional content part of at least one existing stored network resource identifier;

automatically generating, by the at least one processor, for the link, at least one stored network resource identifier in a network resource group of a user profile; and wherein the at least one stored network resource identifier comprises a profile link to the at least one content part or the network resource;

wherein the network resource group is associated with the at least one network resource content classification associated with the user.

Clause 2. A method comprising:

receiving, by at least one processor, a user selection by a user of a link to at least one content part of a network resource;

returning, by the at least one processor, the at least one content part of the network resource based on the link;

monitoring, by the at least one processor, user interactions with the at least one content part of the network resource to produce user interaction data associated with the user;

determining, by the at least one processor, at least one user usage parameter based at least in part on the user interaction data;

automatically determining, by the at least one processor, at least one network resource content classification associated with the at least one content part, the network resource, or both, based at least in part on a content classification machine learning model;

wherein the content classification machine learning model classifies the at least one content part, the network resource, or both, into the at least one network resource content classification associated with the user based at least in part on a content similarity to at least one additional content part of at least one existing stored network resource identifier;

automatically generating, by the at least one processor, for the link, at least one stored network resource identifier in a network resource group of a user profile;

wherein the at least one stored network resource identifier comprises a profile link to the at least one content part or the network resource;

wherein the network resource group is associated with the at least one network resource content classification associated with the user;

determining, by the at least one processor, a record rank associated with the at least one stored network resource identifier based at least in part on a comparison of the at least one user usage parameter with at least one additional user usage parameter associated with at least one additional stored network resource identifier in the network resource group; and causing, by the at least one processor, to display in the user profile on a computing device associated with the user, the network resource group comprising an ordered list of stored network resource identifiers based at least in part on the record rank of the at least one stored network resource identifier.

Clause 3. A system comprising:

at least one processor configured to execute software instructions that, when executed, cause the at least one processor to perform steps to:

receive a user selection by a user of a link to at least one content part of a network resource;

return the at least one content part of the network resource based on the link;

monitor user interactions with the at least one content part of the network resource to produce user interaction data associated with the user;

determine at least one user usage parameter based at least in part on the user interaction data;

automatically determine when a value of the at least one user usage parameter exceeds a threshold value, at least one network resource content classification associated with the at least one content part, the network resource, or both, based at least in part on a content classification machine learning model;

wherein the content classification machine learning model classifies the at least one content part, the network resource, or both, into the at least one network resource content classification associated with the user based at least in part on a content similarity to at least one additional content part of at least one existing stored network resource identifier;

automatically generate for the link, at least one stored network resource identifier in a network resource group of a user profile; and wherein the at least one stored network resource identifier comprises a profile link to the at least one content part or the network resource;

wherein the network resource group is associated with the at least one network resource content classification associated with the user.

Clause 4. The systems and methods of any of claims 1, 2 and/or 3, further comprising:

receiving at least one record modification comprising at least one of:
  i) a record confirmation,
  ii) a record deletion to delete the at least one stored network resource identifier,
  iii) at least one content topic modification modifying the network resource group, the at least one network resource content classification or both, or
  iv) a combination thereof; and training the content classification machine learning model based on a difference between the at least one network resource content classification and the at least one record modification.

Clause 5. The systems and methods of any of claims 1, 2 and/or 3, further comprising: receiving at least one record deletion deleting the at least one stored network resource identifier;

training a usage threshold model based on a difference between the at least one user usage parameter and the threshold value; and generating a new threshold value based at least in part on the usage threshold model.

Clause 6. The systems and methods of any of claims 1, 2 and/or 3, further comprising:

monitoring additional user interactions with additional content of at least one additional content part of at least one additional network resource to produce additional user interaction data;

determining at least one additional user usage parameter based at least in part on the additional user interaction data;

receiving a user selection to create a manual record entry in the user profile for the at least one additional content part;

training a usage threshold model based on a difference between the additional user usage parameter and the threshold value; and
generating a new threshold value based at least in part on the usage threshold model.

Clause 7. The systems and methods of any of claims 1, 2 and/or 3, wherein the user interaction data identifies at least one of:
  i) at least one copied content counter identifying an amount of network resource content copied by the user,
  ii) at least one user visitation counter identifying how many times the user has visited the at least one content part, the network resource, or both, within a time period,
  iii) at least one user visitation time counter identifying an amount of time that the user has viewed the at least one content part, the network resource, or both, within the time period, or
  iv) a combination thereof.

Clause 8. The systems and methods of any of claims 1, 2 and/or 3, wherein the at least one content part comprises at least one of:
  i) an electronic document,
  ii) a webpage,
  iii) a media content item,
  iv) an internal frame (iFrame), or
  v) any combination thereof.

Clause 9. The systems and methods of any of claims 1, 2 and/or 3, further comprising generating the network resource group for the at least one network resource content classification associated with the user.

Clause 10. The systems and methods of any of claims 1, 2 and/or 3, further comprising causing to display the network resource group in the user profile on a computing device associated with the user.

Clause 11. The systems and methods of any of claims 1, 2 and/or 3, further comprising determining a record rank associated with the at least one stored network resource identifier based at least in part on a comparison of the at least one user usage parameter with at least one additional user usage parameter associated with at least one additional stored network resource identifier in the network resource group.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, a user selection by a user of a link to at least one content part of a network resource;
receiving, by the at least one processor, the at least one content part of the network resource returned by a network based on the link;
monitoring, by the at least one processor, user interactions with the at least one content part of the network resource to produce user interaction data associated with the user;
determining, by the at least one processor, at least one user usage parameter based at least in part on the user interaction data;
automatically determining, by the at least one processor, when a value of the at least one user usage parameter exceeds a threshold value, at least one network resource content classification associated with the at least one content part, the network resource, or both, based at least in part on a content classification machine learning model;
wherein the content classification machine learning model classifies the at least one content part, the network resource, or both, into the at least one network resource content classification associated with the user based at least in part on a content similarity to at least one additional content part of at least one existing stored network resource identifier;
automatically generating, by the at least one processor, for the link, at least one stored network resource identifier in a network resource group of a user profile;
wherein the at least one stored network resource identifier comprises a profile link to the at least one content part or the network resource;
wherein the network resource group is associated with the at least one network resource content classification associated with the user;
determining, by the at least one processor, at least one updated user usage parameter based at least in part on at least one record deletion event comprising a deleting of the at least one stored network resource identifier;
training, by the at least one processor, a usage threshold model based on a difference between the at least one updated user usage parameter and the threshold value; and
generating, by the at least one processor, a new threshold value based at least in part on the usage threshold model.

2. The method of claim 1, further comprising:
receiving, by the at least one processor, at least one record modification comprising at least one of:
  i) a record confirmation,
  ii) a record deletion to delete the at least one stored network resource identifier,
  iii) at least one content topic modification modifying the network resource group, the at least one network resource content classification or both, or
  iv) a combination thereof; and
training, by the at least one processor, the content classification machine learning model based on a difference between the at least one network resource content classification and the at least one record modification.

3. The method of claim 1, further comprising:
monitoring, by the at least one processor, additional user interactions with additional content of at least one additional content part of at least one additional network resource to produce additional user interaction data;
determining, by the at least one processor, at least one additional user usage parameter based at least in part on the additional user interaction data;
receiving, by the at least one processor, a user selection to create a manual record entry in the user profile for the at least one additional content part;

training, by the at least one processor, a usage threshold model based on a difference between the additional user usage parameter and the threshold value; and
generating, by the at least one processor, a new threshold value based at least in part on the usage threshold model.

4. The method of claim 1, wherein the user interaction data identifies at least one of:
   i) at least one copied content counter identifying an amount of network resource content copied by the user,
   ii) at least one user visitation counter identifying how many times the user has visited the at least one content part, the network resource, or both, within a time period,
   iii) at least one user visitation time counter identifying an amount of time that the user has viewed the at least one content part, the network resource, or both, within the time period, or
   iv) a combination thereof.

5. The method of claim 1, wherein the at least one content part comprises at least one of:
   i) an electronic document,
   ii) a webpage,
   iii) a media content item,
   iv) an internal frame (iFrame), or
   v) any combination thereof.

6. The method of claim 1, further comprising generating, by the at least one processor, the network resource group for the at least one network resource content classification associated with the user.

7. The method of claim 1, further comprising causing, by the at least one processor, to display the network resource group in the user profile on a computing device associated with the user.

8. The method of claim 1, further comprising determining, by the at least one processor, a record rank associated with the at least one stored network resource identifier based at least in part on a comparison of the at least one user usage parameter with at least one additional user usage parameter associated with at least one additional stored network resource identifier in the network resource group.

9. A method comprising:
   receiving, by at least one processor, a user selection by a user of a link to at least one content part of a network resource;
   returning, by the at least one processor, the at least one content part of the network resource based on the link;
   monitoring, by the at least one processor, user interactions with the at least one content part of the network resource to produce user interaction data associated with the user;
   determining, by the at least one processor, at least one user usage parameter based at least in part on the user interaction data;
   automatically determining, by the at least one processor, at least one network resource content classification associated with the at least one content part, the network resource, or both, based at least in part on a content classification machine learning model;
      wherein the content classification machine learning model classifies the at least one content part, the network resource, or both, into the at least one network resource content classification associated with the user based at least in part on a content similarity to at least one additional content part of at least one existing stored network resource identifier;
   automatically generating, by the at least one processor, for the link, at least one stored network resource identifier in a network resource group of a user profile;
      wherein the at least one stored network resource identifier comprises a profile link to the at least one content part or the network resource;
      wherein the network resource group is associated with the at least one network resource content classification associated with the user;
   determining, by the at least one processor, a record rank associated with the at least one stored network resource identifier based at least in part on a comparison of the at least one user usage parameter with at least one additional user usage parameter associated with at least one additional stored network resource identifier in the network resource group;
   causing, by the at least one processor, to display in the user profile on a computing device associated with the user, the network resource group comprising an ordered list of stored network resource identifiers based at least in part on the record rank of the at least one stored network resource identifier;
   automatically generating, by the at least one processor, for the link, the at least one stored network resource identifier based at least in part on a user usage parameter exceeding a threshold value;
   training, by the at least one processor, a usage threshold model based on a difference between the at least one user usage parameter and the threshold value; and
   generating, by the at least one processor, a new threshold value based at least in part on the usage threshold model.

10. The method of claim 9, further comprising:
   receiving, by the at least one processor, at least one record modification comprising at least one of:
      i) a record confirmation,
      ii) a record deletion to delete the at least one stored network resource identifier,
      iii) at least one content topic modification modifying the network resource group, the at least one network resource content classification or both, or
      iv) a combination thereof; and
   training, by the at least one processor, the content classification machine learning model based on a difference between the at least one network resource content classification and the at least one record modification.

11. The method of claim 9, wherein the at least one processor automatically determines at least one network resource content classification when the at least one user usage parameter exceeds a predetermined value.

12. The method of claim 9, further comprising:
   automatically generating, by the at least one processor, for the link, the at least one stored network resource identifier based at least in part on a user usage parameter exceeding a threshold value;
   monitoring, by the at least one processor, additional user interactions with additional content of at least one additional content part of at least one additional network resource to produce additional user interaction data;
   determining, by the at least one processor, at least one additional user usage parameter based at least in part on the additional user interaction data;
   receiving, by the at least one processor, a user selection to create a manual record entry in the user profile for the at least one additional content part;

training, by the at least one processor, a usage threshold model based on a difference between the additional user usage parameter and the threshold value; and generating, by the at least one processor, a new threshold value based at least in part on the usage threshold model.

13. The method of claim 9, wherein the user interaction data identifies at least one of:
  i) at least one copied content counter identifying an amount of network resource content copied by the user,
  ii) at least one user visitation counter identifying how many times the user has visited the at least one content part, the network resource, or both, within a time period,
  iii) at least one user visitation time counter identifying an amount of time that the user has viewed the at least one content part, the network resource, or both, within the time period, or
  iv) a combination thereof.

14. The method of claim 9, wherein the at least one content part comprises at least one of:
  i) an electronic document,
  ii) a webpage,
  iii) a media content item,
  iv) an internal frame (iFrame), or
  v) any combination thereof.

15. The method of claim 9, further comprising generating, by the at least one processor, the network resource group for the at least one network resource content classification associated with the user.

16. A system comprising:
  at least one processor configured to execute software instructions that, when executed, cause the at least one processor to perform steps to:
    receive a user selection by a user of a link to at least one content part of a network resource;
    return the at least one content part of the network resource based on the link;
    monitor user interactions with the at least one content part of the network resource to produce user interaction data associated with the user;
    determine at least one user usage parameter based at least in part on the user interaction data;
    automatically determine when a value of the at least one user usage parameter exceeds a threshold value, at least one network resource content classification associated with the at least one content part, the network resource, or both, based at least in part on a content classification machine learning model;
      wherein the content classification machine learning model classifies the at least one content part, the network resource, or both, into the at least one network resource content classification associated with the user based at least in part on a content similarity to at least one additional content part of at least one existing stored network resource identifier;
    automatically generate for the link, at least one stored network resource identifier in a network resource group of a user profile;
      wherein the at least one stored network resource identifier comprises a profile link to the at least one content part or the network resource;
      wherein the network resource group is associated with the at least one network resource content classification associated with the user;
    determine least one updated user usage parameter based at least in part on at least one record deletion event comprising a deleting of the at least one stored network resource identifier;
    train a usage threshold model based on a difference between the at least one updated user usage parameter and the threshold value; and
    generating, by the at least one processor, a new threshold value based at least in part on the usage threshold model.

17. The system of claim 16, wherein the at least one processor is further configured to execute software instructions that, when executed, cause the at least one processor to perform further steps to:
  receive at least one record modification comprising at least one of:
    i) a record confirmation,
    ii) a record deletion to delete the at least one stored network resource identifier,
    iii) at least one content topic modification modifying the network resource group, the at least one network resource content classification or both, or
    iv) a combination thereof; and
  train the content classification machine learning model based on a difference between the at least one network resource content classification and the at least one record modification.

* * * * *